Figure 1:
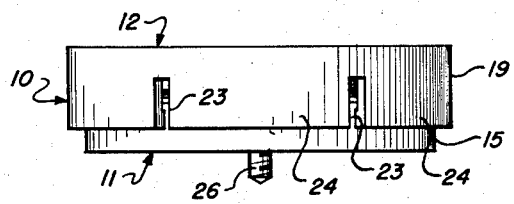

Dec. 10, 1963     D. J. STEVENS ETAL     3,113,755
VIBRATION DAMPING AND SHOCK MOUNT
Filed July 5, 1962

INVENTORS
Don J. Stevens
George W. Forman
BY
Roland G. Anderson

Attorney

United States Patent Office 3,113,755
Patented Dec. 10, 1963

3,113,755
VIBRATION DAMPING AND SHOCK MOUNT
Don J. Stevens, Overland Park, and George W. Forman, Lawrence, Kans., assignors to the United States of America as represented by the United States Atomic Energy Commission
Filed July 5, 1962, Ser. No. 207,827
2 Claims. (Cl. 248—358)

The present invention relates generally to mounting means and more particularly to a vibration damping or absorbing mount which provides a mounting intermediate a hard or rigid mounting and a spring mounting.

When mounting or attaching a package of equipment, e.g., an electronic or mechanical component or assembly, to a wall or supporting structure it is often desirable to employ a coil spring or the like therebetween in order to yieldably support the weight of the equipment. However, if the equipment is of a relatively delicate nature, it is possible that vibrations may cause the equipment to malfunction or even fail since the spring by itself may not normally be capable of damping or absorbing the vibrations; in fact, in some instances the spring may actually tend to enhance the vibration forces acting upon the equipment by introducing a low frequency resonant characteristic. Thus in order to obviate or minimize the detrimental effects of vibration inputs upon delicate equipment it becomes desirable to provide a separate energy dissipating or absorbing means along with the spring to achieve an optimum vibration isolating mount. It is therefore a principal object of the present invention to provide a vibration damping and shock absorbing mount that is capable of removing kinetic energy from the package of equipment through a frictional or interference fit between a pair of mounting parts.

Another object of the present invention is to provide a new and improved vibration damping and shock mount of relatively simple, compact and inexpensive construction.

A further object of the present invention is to provide sliding friction between a pair of relatively movable parts by utilizing finger-like spring segments or sectors on one of the parts which hold the parts together in what may be termed an interference fit condition.

A still further object of the present invention is to provide a vibration and shock mount so arranged that the friction segments of the mount do not slip appreciably until a resonant frequency of the mounted package is approached or until the sum of the force transmitted by the damping mount is greater than the product of the package weight multiplied by the vibration acceleration of the structure.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

Figure 2:
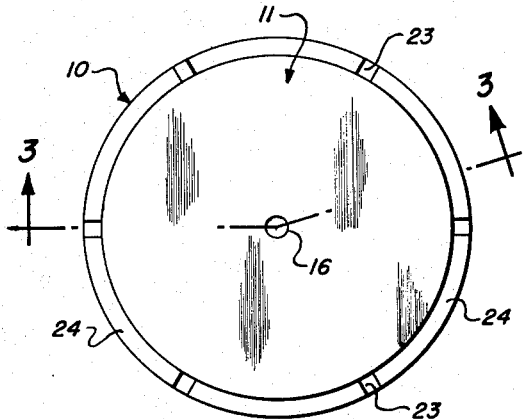
Figure 4:
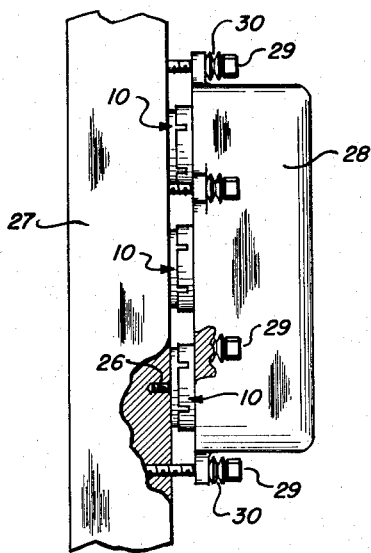
Figure 3:
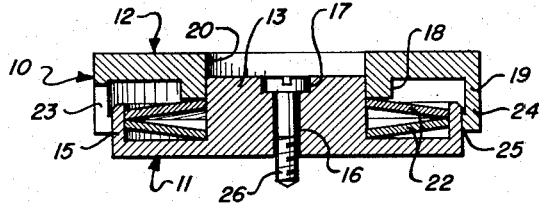

In the accompanying drawings:
FIG. 1 is an elevational view of the present invention;
FIG. 2 is a bottom plan view of the present invention;
FIG. 3 is a sectional view taken along line 3—3 of FIG. 2; and
FIG. 4 is a view, partly cut away, showing a package mounted to a supporting structure with the vibration damping mounts of the present invention therebetween.

Described generally the mounting device of the present invention as illustrated in FIGS. 1–3 comprises a pair of interfitting housing parts with a load supporting spring means positioned therebetween. The housing are arranged so that sliding friction ocurs between them when the device is loaded with sufficient force to reduce its overall height. A side wall of one of the parts is slotted about the periphery thereof to provide the wall with a plurality of sectors or segments which function to hold the parts together in an interference fit condition and provide the sliding friction therebetween. With such an arrangement the entire device acts as a spring with a hysteresis characteristic.

Described in greater detail the vibration damping mount of the present invention generally indicated at 10 comprises a pair of generally round mating elements or parts 11 and 12. Part 11 of the mount may be in the form of a generally cup-shaped member having a centrally located boss or plug section 13 and a peripheral side wall 15. The plug section 13, which may be of a thickness sufficient to provide a spacer between the equipment and the structure so as to prevent deformation of the mounting device when mating parts 11 and 12 are brought closely together, and may be provided with a centrally disposed aperture 16 for facilitating the passage of a bolt or the like 26 therethrough which may be used for attaching the damping mount to suitable supporting structure 27. A counter-bore 17 of suitable depth may be provided about the aperture 16 at the distal end of the plug 13 for forming a suitable seating surface for the head of bolt 26. The skirt or side wall 15, which lies generally parallel to the plug section 13, may extend lengthwise a distance equal to about two-thirds the thickness of the plug section and be of sufficient rigidity so as to substantially resist lateral deformation as will be brought out in greater detail below.

Part 12 of the mount may be in the form of an annular inverted cup-like member having a relatively short inner wall or lip 18 and a peripherally extending outer side wall or skirt 19 which may be longer than the lip 18. The inner lip 18 has several functions, one of which is to form along with an opening 20 through the center of the annular cup-like member a guide passage for the reception of the mating plug section 13. There should be provided a slight clearance between the plug section 13 and the walls of the opening 20 and lip 18 so as to readily facilitate the insertion of the plug portion into the opening 20. The plug section 13 when within the opening 20 provides and maintains correct alignment between the mating parts. Another function of the lip 18 may be to provide a base for the spring means 22 which may be positioned between parts 11 and 12 and provide yieldable support for the weight of the equipment package. While any suitable spring means may be used, e.g., a coiled spring or a plurality of coil springs, satisfactory results have been attained with and it is preferred to use Belleville washers because of their large capacity with small deflections and their ability to be positioned within relatively small spaces. When using Belleville washers, which comprise annular frustro-conical metal rings, it may be desirable to place a pair of such washers 22 within the annular space or groove in the mating part 11 between the plug 13 and the side wall 15 in such a manner that the outer ends of the washers engage the inner wall of the side wall 15 in an abutting relationship with each other while the inner end of one washer engages the part 11 adjacent the innermost portion of the plug 13 and the inner end of the other washer rests upon the distal end of the lip 18 of the part 12 when the mating parts 11 and 12 are brought together. This particular washer arrangement provides optimum spring support within a minimum space.

To provide the mounting device with vibration absorbing or damping qualities, an interference or frictional fit may be provided between the inner surface of the outer base side wall 19 and the outer surface of the side wall 15 by making the inner diameter of the side wall 19 slightly less than the outer diameter of the side wall 15. Thus when the two mating parts 11 and 12 are brought together the side wall 19 will slightly "spring" outwardly to facilitate the reception of the side wall 15 into the annular space between the lip 18 and the wall 19 of the mating portion 12. The top outer circumferential edge of the side wall 15 is beveled to facilitate assembly of the part 12 with the part 11.

The side wall 19 may have spring-like qualities by providing it with slots 23 in several places about its circumference (six such slots are shown in FIG. 3). The slots 23 should be circumferentially spaced an equal distance apart from each other to insure that the spring-like sectors or segments 24 formed between such slots are each of substantially equal strength. The slots 23, which are relatively narrow with respect to the intermediate segments 24 and shown extending to about the middle of the side wall 19, may be spaced approximately 60° apart from each other so that each resulting sector or segment 24 formed therebetween has a substantial arc. The segments 24 thus formed enjoy a rigidity feature which enables the segments 24 to tightly grip the outer surface of the side wall 15 in a relatively unyielding manner. That is they correspond generally to hoop portions for collectively embracing the side wall 15. Each segment 24 may have a radially inwardly extending offset portion 25 adjacent the distal end thereof for providing the contacting surface for the side wall 19 with the outer surface of the side wall 15.

The mating parts 11 and 12 are preferably constructed of different materials for when parts of like material are assembled in an interference fit configuration such as between portions 11 and 12, and "rubbed" together there may be a tendency to "seize" or "fasten" upon each other at the contacting surfaces therebetween which may cause material transfer from one surface to the other and result in excessive wear of such parts. To overcome the above wearing problem it has been found that in a corrosion producing environment the mating part 12 may be made of a relatively strong material such as stainless steel while the mating part 11 may be made of a material such as hardened beryllium-copper or the like which does not "seize" stainless steel. If, however, corrosion protection is not required the mating parts 11 and 12 may be made of a hard bearing alloy and ordinary steel respectively, which provide desired wear characteristics in the use environment anticipated.

When the mounting device is assembled, i.e., when the mating portions 11 and 12 with the spring means 22 therebetween are brought together in an interference fit condition, sliding friction is attained between the two mating parts due to the relationship of the side walls 15 and 19. Thus by appropriately selecting the particular materials used in the mounting device along with the thicknesses of the side walls 15 and 19 and the interference fit therebetween, the amount of friction between the mating portions may be readily determined. Also, if desired, the wall 15 may be provided with a slight outwardly disposed contour so as to increase the friction between walls 15 and 19 with increased deformation of the mounting device.

While the vibration damping mount is shown in a circular configuration with the side wall 19 "broken up" into six segments it will appear clear that the vibration mount may be of any desired shape such as square, rectangular, oval, etc. and that any desired number and arrangement of segments may be used; of course, assuring that each segment is of a suitable circumferential dimension so as to be capable of "gripping" the surface of side wall 15 in a desired manner.

The mounting device may be used to limit vibration amplification in a manner which may be classified as force limiting in that an equipment package 28 which is to be protected may be mounted on the supporting structure 27 in such a manner that the vibration forces between the package and the supporting structure 27 are transmitted through the vibration damping mount 10 which normally acts as a relatively rigid mount (FIG. 4). Thus with the friction, location and number of damping mounts properly chosen, the friction segments 24 of the mounts do not slip appreciably on the side wall 15 until one of the resonant frequencies of the package is approached or until the sum of the forces transmitted by the damping mounts 10 is greater than the product of the package weight multiplied by the vibration acceleration of the supporting structure.

By appropriately selecting the location of the damping mounts with respect to the center of gravity of the package, force limiting may be attained when the vibration input is either perpendicular or parallel to the axis of the damping mounts. For example, as shown in FIG. 4, a package 28 may be mounted to an upright supporting structure 27 so that the axis of each mount 10 is perpendicular to the wall surface. Thus when vibration inputs parallel with the supporting structure face are of sufficient magnitude, the package may start to tip or rock on the damping mounts causing the sliding friction between the mating parts to damp such tipping and rocking which results in force limiting.

The damping mounts may be attached to either the supporting structure 27 or the package 28 with the latter being held against the mounts by bolts 29 or the like which may be threadedly received in the supporting structure. It may be desired to place yieldable means 30, e.g., Belleville washers, adjacent each bolt head so that the package may be spring-loaded against the vibration mount. When attaching the damping mounts to either the package or the wall structure it may be desirable to pre-load the mounts by tightening the bolts 29 so that the distal ends of the segments 24 extend to about the middle of the side wall 15. This pre-loading of the mounts places initial loads upon the springs 22 which assures that any deformation of the springs 22 from this semi-compressed condition effects movement between parts 11 and 12 and produces frictional forces which result in a kinetic energy loss from the mounted package in the form of heat.

By limiting the vibration acceleration forces between package and supporting structure, the vibration acceleration of the package is limited or prevented from building up above a pre-determined maximum value. The maximum vibration acceleration of the package can be limited to less than four times the maximum vibration acceleration of the supporting structure provided, however, that the maximum vibration acceleration of the supporting structure is known in advance.

As will be seen the mounting device is intended to allow some vibration amplifications on the package as compared to the supporting structure but it does not introduce a low frequency resonance characteristic. The device also offers a definite size advantage due to its capability of supporting large loads while being maintained at a relative small physical size.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

We claim:

1. An energy absorbing vibration damping and shock mount of the character described comprising a pair of generally cup-shaped annular members each having a central portion and a laterally disposed skirt portion forming a peripheral wall abount the central portion, a radius from an outer surface of the peripheral wall of one of said skirt portions to the center of the mount being slightly greater than an adjacent radius from an inner surface of the peripheral wall of the other skirt portion, one of said skirt portions being relatively flexible with respect to the other skirt portion and comprising a plurality of elongate segments each having a laterally extending lip coextensive with the length of the segment and disposed adjacent the distal end thereof, the other skirt portion having a beveled leading edge about its distal end, said members being disposed in oppositely facing nesting relationship wherein the beveled leading edge on the other of said skirt portions initially contacts each of said lips and laterally deforms the segments of said one skirt portion for effecting a firm frictional engagement between said members at the interface thereof, one of said central portions having a guiding aperture therein, a boss on the central portion of the other of said members fitting into said aperture for guiding said members and skirt portions along each other during movement of said members toward and away from each other such that the frictional engagement between the said other skirt portion and said lips absorbs kinetic energy introduced into said mount, and yieldable means housed within said members intermediate the central and skirt portions for urging said skirt portions toward a direction of disengagement.

2. An energy absorbing vibration damping and shock mount of the character described comprising a pair of generally cup-shaped annular members disposed in an oppositely facing nesting relationship, one of said members comprising a centrally disposed projection perforated by a guiding aperture and a skirt portion laterally outwardly disposed from the projection and forming a peripheral wall extending thereabout, said skirt portion being slotted at circumferentially spaced apart locations for providing a plurality of yieldable elongate segments each including a laterally inwardly extending reinforcing lip adjacent the distal end and substantially coextensive with the length thereof, the other of said members comprising a centrally disposed boss for fitting into said guiding aperture and a further skirt portion laterally disposed from said boss and forming thereabout a continuous peripheral wall having a beveled leading edge about the distal end thereof, said further skirt portion being relatively rigid with respect to the slotted skirt portion, a radius extending from an outermost surface of the continuous peripheral wall to the center of said mount being slightly greater than an adjacent radius extending from an innermost surface of one of said lips, said members being disposed in an interference fit relationship wherein the beveled leading edge initially abuts against said lips for laterally outwardly deforming said segments to effect a firm frictional engagement between said members at the interface of said lips and said further skirt portion, said aperture receiving said boss for guiding said members and skirt portions along each other during movement of said members toward and away from each other such that the frictional engagement between the said further skirt portion and said lips absorbs kinetic energy introduced into said mount, and a pair of oppositely disposed frustro-conical and annular spring means disposed between said members with abutting outer peripheral portions and spaced apart inner portions one of which is disposed on the perforated projection, said spring means urging said members toward a direction of disengagement.

References Cited in the file of this patent

UNITED STATES PATENTS

| 1,641,856 | Lloyd | Sept. 6, 1927 |
| 2,942,868 | Stewart | June 28, 1960 |
| 3,006,673 | Swick | Oct. 31, 1961 |

FOREIGN PATENTS

| 765,824 | Great Britain | Jan. 16, 1957 |